United States Patent

[11] 3,626,202

[72] Inventor Alan E. Pound
Sunnyvale, Calif.
[21] Appl. No. 61,028
[22] Filed July 13, 1970
[45] Patented Dec. 7, 1971
[73] Assignee American Micro-Systems, Inc.
Santa Clara, Calif.
Original application Aug. 23, 1967, Ser. No. 662,761, now abandoned. Divided and this application July 13, 1970, Ser. No. 61,028

[54] LOGIC CIRCUIT
6 Claims, 7 Drawing Figs.

[52] U.S. Cl. .......... 307/208, 307/205, 307/293, 307/304, 328/55
[51] Int. Cl. .......... H03k 19/08
[50] Field of Search .......... 307/205, 207, 208, 293, 304, 279; 328/55, 92

[56] References Cited
UNITED STATES PATENTS

| | | | |
|---|---|---|---|
| 3,567,968 | 3/1971 | Booher | 307/293 |
| 3,145,309 | 8/1964 | Bothwell | 307/208 |
| 3,385,980 | 5/1968 | Geller | 307/208 |
| 3,258,677 | 6/1966 | Carruth | 307/208 |

*Primary Examiner*—Donald D. Forrer
*Assistant Examiner*—David M. Carter
*Attorney*—Owen, Wickersham & Erickson ABSTRACT: A logic circuit is disclosed comprised of two separate but connectable sections, namely a complex gate section and a delay section. The gate section has five input terminals for receiving data and/or control input signals and a single output, the delay section having a single input and two outputs providing a one-bit delay output and a complemented one-bit delay. By means of various interconnections the circuit can provide a wide range of functional devices including various flip-flop arrangements with clear and load capabilities.

INVENTOR
ALAN E. POUND
BY
Owen, Wickersham & Erickson
ATTORNEYS

INVENTOR
ALAN E. POUND

BY

Owen, Wickersham & Erickson
ATTORNEYS

INVENTOR
ALAN E. POUND
BY
Owen, Wickersham & Erickson
ATTORNEYS

LOGIC CIRCUIT

This application is a division of application Ser. No. 662,761, filed Aug. 23rd, 1967.

This invention relates to a programmable logic element and more particularly, it relates to a building block type of multipurpose logic circuit whose logical function can be altered by changing the connection of its external inputs and outputs.

In the design and development of electronic devices utilizing logic circuits of various types, it is often necessary to construct and test prototype or breadboard systems before production can commence. To simplify and speed up this development work, a need arose for a universal logic element with a high degree of versatility which could be supplied economically and in quantity and which with only slight modification could provide many of the well-known logic functions.

An earlier attempt to provide a multipurpose logic circuit is disclosed in my copending application, Ser. No. 575,073, filed Aug. 25, 1966 now Pat. No. 3,510,787, which utilized four input data signal connections. Although this previous logic circuit performed more than a single logic function, its range of applications was limited compared with the present invention.

It is therefore a general object of the present invention to provide an improved multipurpose logic circuit with input and output terminals arranged so that it is capable of being connected in a greater variety of circuit configurations and thus applicable as a building block in constructing many different types of complex electronic systems.

A more specific object of the present invention is to provide a universal logic circuit in which a gate section is separate from but readily connectable to a delay section, each section having its own inputs and outputs.

Another object of the invention is to provide an improved universal logic circuit of the aforesaid type in which the gate section has five inputs. This greatly increases the versatility of the circuit since it allows for its connections with four or five data inputs or four data inputs in conjunction with a control input such as a clear and load signal, thereby greatly increasing the number of circuit configurations available.

Another object of the invention is to provide a logic circuit in which the bit of delay circuit has an ordinary one-bit delay output and a complemented one-bit delay output, which outputs are isolated so that one of these outputs can be loaded in any manner without affecting the other output.

Yet another object of the present invention is to provide a logic circuit that is particularly adaptable for manufacture in the form of an integrated circuit semiconductor device which can be provided with all of the desirable features of construction, such as gate protection, to assure its reliability and long life, and with its various input and output terminals arranged for ease in forming alternate circuit configurations.

Other objects, advantages and features of the present invention will become apparent from the following detailed description taken in conjunction with the drawings in which.

Figure 1:
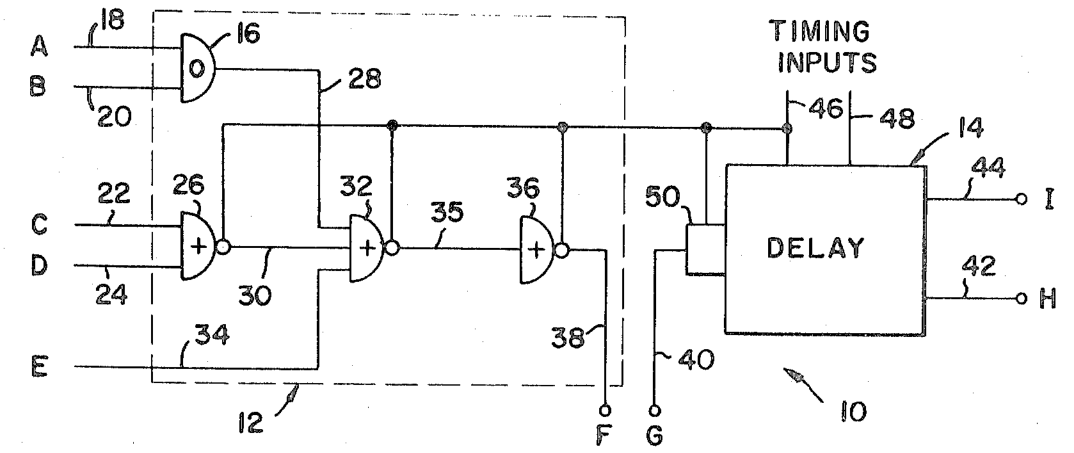
FIG. 1 is a schematic logic diagram of the logic delay circuit of the present invention.

With reference to the drawing, FIG. 1 shows schematically a universal logic circuit 10 embodying the principles of the present invention which can be utilized to perform sampling, selecting, comparing and various flip-flop functions with clear and load capabilities. Essentially, it comprises two main sections, namely a gate section 12 and a delay section 14 which are operable separately or in combination and are located closely adjacent to each other so as to be readily connectable depending on the desired application of the circuit 10. The gate section 12 has five data input signal connections which are designated A, B, C, D, and E, and one output F. The delay section 14 has one input connection G and two output connections H and I. By the interconnection of the input and output connections of these two sections in various manners including direct and feedback connections, a wide range of logical functions can be provided by the circuit 10, as will be described later.

The gate section of the circuit 10 comprises a conventional AND-gate circuit 16 having the first two input connections A and B for receiving logic data input signals through a pair of conductors 18 and 20. The third and fourth input connections C and D receive logic data input signals and are connected through a pair of conductors 22 and 24 to a first conventional NOR-gate circuit 26. The output from the AND-gate 16 over a conductor 28 and the output from the NOR-gate 26 over a conductor 30 are both connected to and provide two inputs of a total of three inputs to a second conventional NOR-gate circuit 32. A third input to the NOR-gate circuit 32 is supplied through a conductor 34 from the terminal E which may be connected to a fifth independent data or control signal source.

Connected to the output of the NOR-gate circuit 32 through a conductor 35 is an inverter circuit 36 which could be another NOR gate whose output through a conductor 38 at the terminal or connection F comprises the output of the entire gate section 12.

The one-bit delay section 14 of my logic circuit 10 has an input terminal G which is located near the gate output terminal F and is connected through a conductor 40. The one-bit delay section 14 as shown in FIG. 1 in block form has a pair of outputs through conductors 42 and 44 which are connected to terminals H and I, respectively. In accordance with an important feature of my invention the outputs at H and I are isolated from each other by the delay section so that a one-bit delay signal is provided at the terminal I and a complemented one-bit delay signal is provided at the terminal H. Different embodiments of the delay section 14 that provide these isolated delay outputs will be described in detail later with reference to FIGS. 4 to 6.

Thus, my logic circuit includes five data input connections for receiving logic data input signals at terminals A, B, C, D, and E; a gate output terminal F; a delay circuit input terminal G; and two isolated delay circuit output terminals H and I for producing logic data output signals. By varying the manner in which these terminals of the logic circuit 10 are connected to incoming data logic signals from external sources and to each other when feedback connections are employed, the logic circuit 10 may perform several logical functions without the use of additional external circuits, such as gate circuits, active devices, passive components, or the like.

As tabulated in the chart which follows, some of the circuits that may be formed with my logic circuit to perform certain logical operations are as follows: JK flip-flop with a clear or a load input; $\overline{JK}$ flip-flop with a clear or a load input; a binary counter or T flip-flop with a clear or a load input; a complemented binary counter of $\overline{T}$ flip-flop with a clear or a load input; an RS flip-flop with a set or reset override and either a clear or a load input; an $\overline{RS}$ flip-flop with a set or reset override and either a clear or a load input; a sample and hold flip-flop with a load input; a complemented data sample and hold flip-flop with a clear input; a complemented strobe sample and hold flip-flop with a clear input; a complemented sample and hold flip-flop with a load input; a one-bit delay flip-flop; an AB comparator with or without delay (Half Adder); a two-stream select gate; an inverter; a two-input NOR gate; a two-input AND gate; and a five-input complex-gate.

In accordance with well-known principles, the AND-gate circuit 16 will produce a logic 1 signal over the conductor 28 only when both input circuits thereof have impressed thereon over conductors 18 and 20 logic 1 signals. Should there be a logic 0 signal on either the conductor 18 or the conductor 20 or on both conductors, then the output signal over the conductor 28 will be a logic 0 signal. The following truth table shows this operation:

| A | B | Conductor 28 |
|---|---|---|
| 0 | 0 | 0 |
| 1 | 0 | 0 |
| 0 | 1 | 0 |
| 1 | 1 | 1 |

The NOR-gate circuit 26 operates as an OR-gate circuit with the logic signal output inverted. Thus, if either or both of the logic signals impressed on the input circuits of the NOR-gate circuit 26 over the conductors 22 and 24 is a logic 1 signal, then the output signal transmitted over the conductor 30 from the NOR-gate circuit 26 is a logic 0 signal. Should both logic signals transmitted over the conductors 22 and 24 be logic 0 signals, then the output signal transmitted over the conductor 30 is a logic 1 signal. The following truth table shows this operation:

| C | D | Conductor 30 |
|---|---|---|
| 0 | 0 | 1 |
| 1 | 0 | 0 |
| 0 | 1 | 0 |
| 1 | 1 | 0 |

As previously described, the output circuits of the AND-gate circuit 16 and the NOR-gate circuit 26 are connected to the input circuits of the NOR-gate circuit 32. If both input logic signals transmitted over the conductors 28 and 30 are zero, then the logic output signal transmitted over the conductor 35 from the output circuit of the NOR-gate circuit 32 is a logic 1 signal. If either or both signals transmitted over the conductors 28 and 30 is a logic 1 signal, then the logic output signal transmitted over the conductor 35 is a logic 0 signal. The inverter 36 serves merely to invert the signal from the NOR-gate 32. Thus, if either input signal to the NOR-gate 32 is a logic 1 signal or if both input signals are logic 1 signals, then the output signal from the inverter 36 is a logic 1 signal. This operation can be seen from the following truth table:

| Conductor 28 | Conductor 30 | Conductor 35 | Conductor 38 |
|---|---|---|---|
| 0 | 0 | 1 | 0 |
| 1 | 0 | 0 | 1 |
| 0 | 1 | 0 | 1 |
| 1 | 1 | 0 | 1 |

The fifth input to the connection E which is fed directly to the NOR-gate 32 over the conductor 34 gives my logic circuit a unique versatility and may be utilized in a number of ways to provide a wide range of logic and control functions heretofore available only in separate single function devices. One primary use for it in various flip-flop arrangements is to supply a clear or a load control signal. The clear function returns the flip-flop to a logic 0 state whenever a clear signal of logic 1 is impressed over the conductor 34 to NOR-gate circuit 32. Conversely, a load function when applied over the conductor 34 puts the flip-flop in the logic 1 state. The fifth input thus provides a means for altering or controlling the logical function or state of a single circuit 10 or a group of these circuits without requiring additional logic gating connected to the normal data inputs A, B, C, or D.

A truth table summarizing the operation of the gate circuit 12 may be represented as follows:

| A | B | C | D | E | Conductor 28 | Conductor 30 | Conductor 35 | F |
|---|---|---|---|---|---|---|---|---|
| 0 | 0 | 0 | 0 | 0 | 0 | 1 | 0 | 1 |
| 1 | 0 | 0 | 0 | 0 | 0 | 1 | 0 | 1 |
| 0 | 1 | 0 | 0 | 0 | 0 | 1 | 0 | 1 |
| 1 | 1 | 0 | 0 | 0 | 1 | 1 | 0 | 1 |
| 0 | 0 | 1 | 0 | 0 | 0 | 0 | 1 | 0 |
| 1 | 0 | 1 | 0 | 0 | 0 | 0 | 1 | 0 |
| 0 | 1 | 1 | 0 | 0 | 0 | 0 | 1 | 0 |
| 1 | 1 | 1 | 0 | 0 | 1 | 0 | 0 | 1 |
| 0 | 0 | 0 | 1 | 0 | 0 | 0 | 1 | 0 |
| 1 | 0 | 0 | 1 | 0 | 0 | 0 | 1 | 0 |
| 0 | 1 | 0 | 1 | 0 | 0 | 0 | 1 | 0 |
| 1 | 1 | 0 | 1 | 0 | 1 | 0 | 0 | 1 |
| 0 | 0 | 1 | 1 | 0 | 0 | 0 | 1 | 0 |
| 1 | 0 | 1 | 1 | 0 | 0 | 0 | 1 | 0 |
| 0 | 1 | 1 | 1 | 0 | 0 | 0 | 1 | 0 |
| 1 | 1 | 1 | 1 | 0 | 1 | 0 | 0 | 1 |
| X | X | X | X | 1 | X | X | 0 | 1 |

NOTE.—"X" indicates a "don't care" condition where the variable may be either a logic 1 or a logic 0.

The one-bit delay circuit 14 provides a means for storing one bit of logic information and transmitting the stored information over either the conductor 44 in the true form or the conductor 42 in the complemented form after a predetermined time delay. Thus, the input logic signal transmitted from the input G of the delay section over the conductor 40 whether it be a logic 1 or a logic 0 signal will be transmitted over the conductor 44 to the output I as a logic 1 or a logic 0, respectively, and will also be transmitted over the conductor 42 to the output H as a logic 0 or a logic 1, respectively, after a predetermined time delay.

Although two timing inputs 46 and 48 are shown symbolically in FIG. 1, it is understood that one or more than two such inputs could be utilized. This predetermined time delay may be controlled by separate timing inputs depending on whether a single phase or a multiphase timing system is employed.

In order to obtain precisely one bit of delay, it is necessary to have the incoming data to the bit of delay properly synchronized with the timing inputs to the bit of delay. In the present invention I may accomplish this synchronization by the use of a data sampler element 50 which receives a timing input such as from input 46 and thus transmits data to the bit of delay only at the proper time. This data sampler will be described later in greater detail in the description of various embodiments of the bit of delay with reference to FIGS. 4 to 6.

Also, in the present invention one or more of the timing inputs such as from conductor 46 may be connected to the NOR-gates 26 and 32 and the inverter 36 to synchronize the data flow from the gate section 12.

Figure 2:
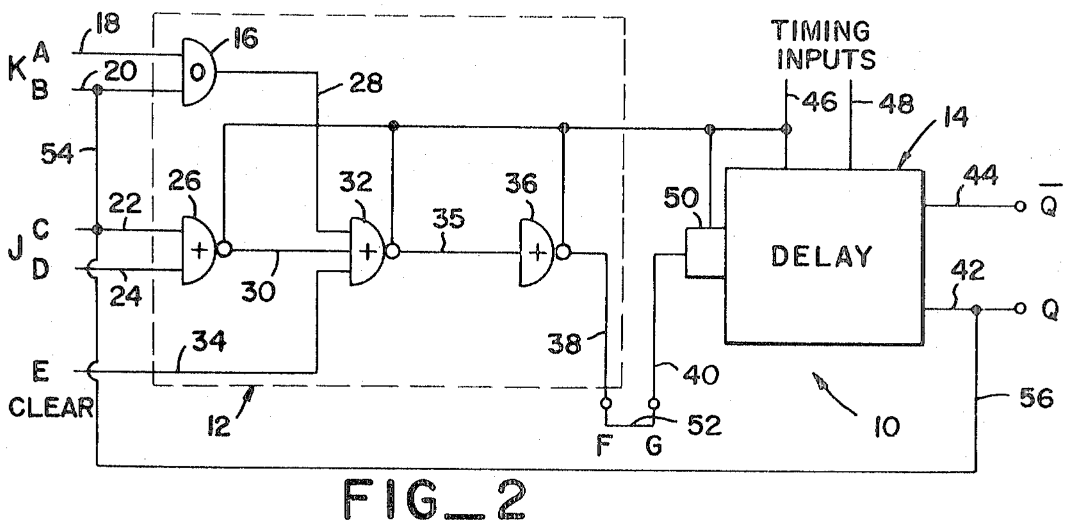
FIG. 2 is a schematic logic diagram of a JK flip-flop with a clear input employing the logic delay circuit arrangement illustrated in FIG. 1.

In FIG. 2, a logic delay circuit 10*a* is illustrated with its inputs to the AND-gate circuit 16 and the NOR-gate circuit 26 connected to logic data input connections from an external source and to feedback connections to perform the flip-flop logic functions of the JK-type circuit. The fifth lead input at the terminal E is connected to a suitable signal source to provide a clear control signal in such a circuit, and the gate section output terminal F is connected to the delay input terminal G by a conductor 52.

In a JK flip-flop circuit, if the J data input signal and the K data input signal are logic 0, the output logic signal of the JK flip-flop circuit remains the same at the next bit time. If the J data input signal is a logic 1 and the K data input signal is a logic 0, then the JK flip-flop circuit is set and produces a logic 1 signal on the true or Q, output at the next bit time. Should the K data input signal be a logic 1 and the J data input signal be a logic 0, then the JK flip-flop circuit is reset and produces a logic 0 signal on the true output at the next bit time. In the event the J data input signal and the K data input signal are both a logic 1, the logic state of the JK flip-flop circuit is complemented at the next bit time.

As shown, a K data input signal is impressed on the terminal A and transmitted over the conductor 18 to be fed to one input of the AND-gate circuit 16. The other input circuit of the AND-gate circuit 16 is connected to one input circuit of the NOR-gate circuit 26 over a conductor 54. Also, the input conductors 20 and 22 are connected through the conductor 54 to a feedback connection 56. The feedback connection 56 which is connected to the interconnected input circuits of the AND-gate circuit 16 and the NOR-gate circuit 26 is also connected to the complemented output of the delay circuit 14 over the conductor 42. Therefore, the output signal produced in the output of the delay circuit 14 is fed to the interconnected input circuits of the AND-gate circuit 16 and the NOR-gate circuit 26. The J data input signal is impressed on the terminal D and is transmitted over the conductor 24 to be fed to the other input circuit of the NOR-gate circuit 26. The clear input from the terminal E is connected directly to the NOR-gate 32 over the conductor 34.

Figure 3:
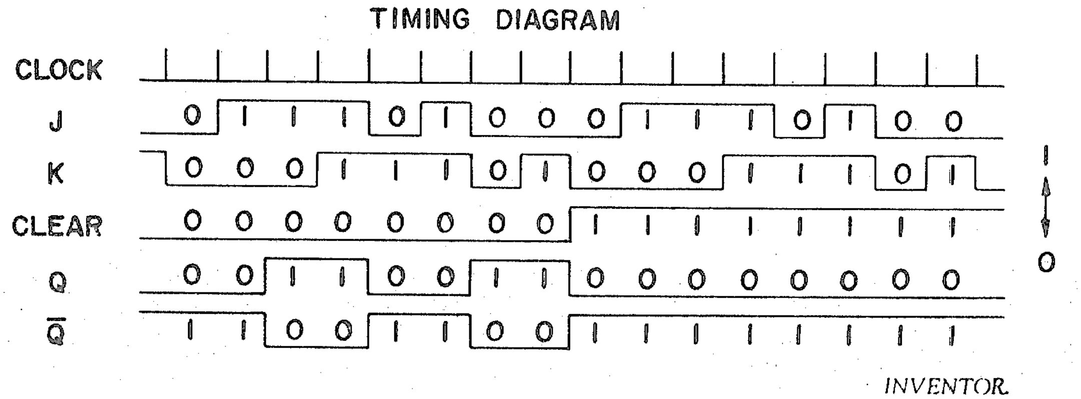
FIG. 3 is a diagrammatic illustration of the timing signals employed in the operation of the JK flip-flop circuit with a clear input shown in FIG. 2.

A timing diagram shown in FIG. 3 illustrates the relationship of the input signals, the timing and the outputs for this particular flip-flop configuration. It is understood that this diagram represents only one of many possible input data sequences. However, in all cases the output signals will respond to the data input signals according to the following formula:

$$Q=J\bar{C}\bar{q}+\bar{K}\bar{C}q$$

At bit time $n$: J is the data input signal to the input terminal D; K is the data input signal to the input terminal A; and C is the clear input signal to the input terminal E; $q$ is the output logic signal transmitted over the conductor 42 from the complemented delay output. Q is the output logic signal transmitted over the conductor 42 from the one-bit delay circuit 14 at bit time $n+1$. The following truth table shows the operation of the JK flip-flop circuit 10*a* when the logic signals J, K, C, $q$ and Q represent the same functions as above-described:

| Bit Time $n$ | | | | Bit Time $n+1$ |
|---|---|---|---|---|
| J | K | C | Q | Q |
| 0 | 0 | 0 | 0 | 0 |
| 1 | 0 | 0 | 0 | 1 |
| 0 | 1 | 0 | 0 | 0 |
| 1 | 1 | 0 | 0 | 1 |
| 0 | 0 | 0 | 1 | 1 |
| 1 | 0 | 0 | 1 | 1 |
| 0 | 1 | 0 | 1 | 0 |
| 1 | 1 | 0 | 1 | 0 |
| X | X | 1 | 0 | 0 |
| X | X | 1 | 1 | 0 |

"X" Indicates a "don't care" condition.

If, during bit time $n$ the true output signal ($q$) of the delay section 14 transmitted over the conductor 42 is a logic 0 signal, and if the data input signals J, K and C are logic 0 signals, then, logic 0 signals are fed to the input circuits of the NOR-gate circuit 26 to produce a logic 1 output signal. Also, logic 0 signals are fed to the input circuits of the AND-gate circuit 16 to produce a logic 0 for transmission over the conductor 28. This produces a logic 0 signal in the output of the NOR-gate circuit 32 which is complemented to a logic 1 signal by the inverter 36 for transmission through the terminals F and G to the one-bit delay circuit 14. After a predetermined time delay, which in turn defines bit time $n+1$, the one-bit delay circuit 14 produces a logic 0 signal at the Q output thereof for transmission over the conductor 42. A logic 1 signal is produced at the complemented output ($\bar{Q}$) of the delay circuit 14 for transmission over the conductor 44. During the state $n$, the logic 1 signal appeared on the output terminal I and a logic 0 signal appeared on the output terminal H. Under the above conditions no change in logic output signals occurred during the $n+1$ state of the flip-flop circuit 10*a*, since the terminal I has impressed therein a logic 1 signal and the terminal H has impressed thereon a logic 0 signal.

Now, if the input logic signal J is changed from a logic 0 signal to a logic 1 signal and the other conditions remain the same, the output signal transmitted by the AND-gate circuit 16 for transmission to one input of the NOR-gate circuit 32 over the conductor 28 is still a logic 0 signal. Transmitted to the input circuits of the NOR-gate circuit 26 over the conductors 22 and 24 are logic signals 0 and 1, respectively. This results in a logic 0 signal produced in the output circuit of the NOR-gate circuit 26 for transmission to another input circuit of the NOR-gate circuit 32 over the conductor 30. Therefore, a logic 1 output signal is produced in the output circuit of the NOR-gate circuit 32 for inversion and transmission to the one-bit delay circuit 14. After a predetermined time delay, the one-bit delay circuit 14 transmits a logic 1 signal over the conductor 42. As a result thereof, a logic 0 signal appears on the terminal I and a logic 1 signal appears on the terminal H and the flip-flop circuit 10*a* is set at the bit time $n+1$. Therefore, the Q output has changed from a logic 0 state to a logic 1 state.

Now, it is assumed that the data input signal K is a logic 1 and the data input J is a logic 0 signal. The feedback signal $q$ is a logic 1 signal during this bit time. This is indicative of the flip-flop circuit 10*a* being set during bit time $n$. With a logic 0 signal transmitted over the conductor 24 and with a logic 1 signal transmitted over the conductor 22, the NOR-gate circuit 26 produces a logic 0 signal for transmission over the conductor 30. The AND-gate circuit 16 has logic 1 signals impressed on the input circuits thereof over the conductors 18 and 20. Hence, a logic 1 signal is produced in the AND-gate circuit 16 for transmission over the conductor 28. Accordingly, a logic 0 signal and a logic 1 signal are fed to the input circuits of the NOR-gate circuit 32, which results in a logic 0 signal being produced at its output for transmission over the conductor 35 to the inverter 36 and thence as a logic 1 signal through the terminals F and G to the one-bit delay circuit 14. After a predetermined time delay, the one-bit delay circuit 14 transmits a logic 0 signal over the conductor 42. As a result thereof, a logic 1 signal is impressed on the output terminal I and a logic 0 signal is impressed on the output terminal H. With a logic 1 output on the terminal I and a logic 0 output on the terminal H, the flip-flop circuit 10*a* is reset during bit time $n+1$.

It is now assumed that during bit time $n$ the feedback logic signal ($q$) transmitted over the feedback connection 56 is a logic 0 signal. During bit time $n$, the data input signal K is a logic 1 signal and the data input signal J is a logic 1 signal. From these conditions, the NOR-gate circuit 26 produces a logic 0 signal in the output thereof for transmission over the conductor 30, and the AND-gate circuit 16 produces a logic 0 signal in the output thereof for transmission over the conductor 28. As a result thereof, the output signal produced by the NOR-gate circuit 32 for transmission over the conductor 35 to the inverter 36 is a logic 1 signal. The inverter 36 changes this to a logic 0 signal for transmission through terminals F and G. The one-bit delay circuit 14 after predetermined time delay transmits a logic 1 signal over the conductor 42, thereby impressing a logic 0 signal on the terminal I and a logic 1 signal on the terminal H. Thus, the logic output of the flip-flop circuit 10*a* has been complemented during bit time $n+1$ with respect to the prior logic output state during bit time $n$.

Now, assume the data input logic signals J and K are both logic 1 signals during the bit time $n$ and the output logic signal appearing on the terminal H ($q$) for transmission over the feedback connection 56 is a logic 1 signal. Under these conditions, the output of the NOR-gate circuit 26 is a logic 0 signal and the output of the AND-gate circuit 16 is a logic 1 signal. Therefore, the output of the NOR-gate circuit 32 is a logic 0 signal and the output of the inverter 36 is a logic 1 signal. The one-bit delay circuit 14 in a manner previously described transmits a logic 0 signal over the conductor 42 after a predetermined time delay. Accordingly, appearing on the output terminal H is a logic 0 signal and appearing on the output terminal I is a logic 1 signal. Thus, the logic output of the JK flip-flop circuit 10*a* has been complemented during the bit time $n+1$ with respect to the prior logic output during bit time $n$. Therefore, when both data logic input signals J and K are logic 1 signals, the JK flip-flop circuit 10*a* outputs are complemented regardless of their previous states.

When a logic 1 signal is applied to the terminal E and thus to the NOR-gate circuit 32 at bit time $n$, the latter's output is a logic 0 signal regardless of the states of the J, K and $q$ inputs. Thus, under these circumstances the flip-flop circuit is cleared, and its true output at terminal H will become a logic 0 signal at bit time $n+1$.

The opposite load function will be accomplished if a logic 1 signal is applied to the terminal E and thence to the NOR-gate circuit 32, and if the inputs and outputs of the logic circuit 10*a* are merely redefined, such that J replaces K on terminal A, and K replaces J on terminal D, and Q replaces $\bar{Q}$ on terminal I, and $\bar{Q}$ replaces Q on terminal H, all other operations will remain as defined for the previous JK flip-flop with a clear input. The JK flip-flop with a load input can be represented mathematically by the formula $$Q=J\bar{q}+\bar{K}q+L$$

For purpose of clarity, it will be further assumed that the potential on the terminal H ($\bar{q}$) during bit time $n$ is a logic 1 signal, and that data input signals J and K during bit time $n$ are logic 0 signals. Then, the output signal from the NOR-gate circuit 26 is a logic 0 signal and the output signal from the AND-gate circuit 16 is a logic 0 signal. However, the logic 1 signal applied at terminal E causes the output signal from the NOR-gate circuit 32 to become a logic 0 signal. After a predetermined time delay, the one-bit delay circuit 14 transmits a logic 0 signal over the conductor 42 and a logic 1 signal over the conductor 44. Thus, this JK flip-flop circuit with a load input is set between bit time $n$ and $n+1$.

In addition to the two circuits just described, the chart provided below tabulates other circuit configurations that are possible with my logic circuit when the terminals are connected as shown. Many different but well-known flip-flop and other logic arrangements are possible by varying the terminal connections and definitions as shown, each circuit utilizing either a clear or a load input at the terminal E. It is understood, however, that the fifth terminal E could be connected to a logic 0 signal and not sued if it was desired to provide the conventional flip-flop functions without the added control function. In this chart, which should be self-explanatory, the columns under each terminal contain a designation of the other terminals to which it is connected to provide the particular logic function. Using the mathematical formula shown for each configuration, the truth tables for each of these alternate circuit arrangements can be ascertained by applying well-known principles of logic and thus need not be shown.

ALTERNATE LOGIC CIRCUIT EMBODIMENTS

| Type of circuit | Terminal connections | | | | | | | | |
|---|---|---|---|---|---|---|---|---|---|
| | A | B | C | D | E | F | G | H | I |
| JK flip-flop with a clear input $Q=\overline{JC}q+\overline{KC}q$ | K data input | C,H | B,H | J data input | Clear input | G | F | (1) | (2). |
| JK flip-flop with a load input $Q=J\bar{q}+\bar{K}q+L$ | J data input | C,H | B,H | K data input | Load input | G | F | C,B,$\bar{Q}$ | Q |
| $\overline{JK}$ flip-flop with a clear input $Q=J\overline{Cq}+\overline{KC}q$ | $\bar{J}$ data input | C,I | B,I | $\bar{K}$ data input | Clear input | C | F | Q | C,B,$\bar{Q}$ |
| $\overline{JK}$ flip-flop with a load input $Q=J\bar{q}+\bar{K}q+L$ | $\bar{K}$ data input | C,I | B,I | $\bar{J}$ data input | Load input | G | F | $\bar{Q}$ | C,B,Q |
| Binary counter (T flip-flop) with a clear input $Q=T\overline{Cq}+\overline{TC}q$ | T data input & D | C,H | B,H | T data input & A | Clear input | G | F | B,C,Q | $\bar{Q}$ |
| Binary counter (T flip-flop) with a load input $Q=T\bar{q}+\bar{T}q+L$ | T data input & D | C,H | B,H | T data input & A | Load input | G | F | B,C,$\bar{Q}$ | Q |
| Complemented binary counter ($\bar{T}$ flip-flop) with a clear input $Q=T\overline{Cq}+\overline{TC}q$ | $\bar{T}$ data input & D | C,I | B,I | $\bar{T}$ data input & A | Clear input | G | F | Q | B,C,$\bar{Q}$ |
| Complemented binary counter ($\bar{T}$ flip-flop) with a load input $Q=T\bar{q}+\bar{T}q+L$ | $\bar{T}$ data input & D | C,I | B,I | $\bar{T}$ data input & A | Load input | G | F | $\bar{Q}$ | B,C,Q |

ALTERNATE LOGIC CIRCUIT EMBODIMENTS —Continued

| Type of circuit | Terminal connections | | | | | | | | |
|---|---|---|---|---|---|---|---|---|---|
| | A | B | C | D | E | F | G | H | I |
| RS flip-flop with R override and a clear input<br>$Q=S\overline{RC}+\overline{RC}q$ | R data input & B | R data input & A | S data input | H | Clear input | G | F | D,Q | $\overline{Q}$ |
| RS flip-flop with S override and a load input<br>$Q=S+\overline{R}q+L$ | S data input & B | S data input & A | R data input | H | Load input | G | F | D,$\overline{Q}$ | Q |
| $\overline{RS}$ flip-flop with R override and a clear input<br>$Q=S\overline{RC}+\overline{RC}q$ | $\overline{S}$ data input | I | $\overline{R}$ data input & D | $\overline{R}$ data input & C | Clear input | G | F | Q | B,$\overline{Q}$ |
| $\overline{RS}$ flip-flop with S override and a load input<br>$Q=S+\overline{R}q+L$ | $\overline{R}$ data input | I | $\overline{S}$ data input & D | $\overline{S}$ data input & C | Load input | G | F | $\overline{Q}$ | B,Q |
| Sample and hold flip-flop with a load input<br>$Q=SD+\overline{S}q+L$ | Data input | Sample input & C | Sample input & B | H | Load input | G | F | D,$\overline{Q}$ | Q |
| Complemented data sample and hold flip-flop with a clear input<br>$Q=SD\overline{C}+\overline{SC}q$ | $\overline{\text{Data}}$ | Sample input & C | Sample input & B | H | Clear input | G | F | D,Q | $\overline{Q}$ |
| Complemented strobe sample and hold flip-flop with a clear input<br>$Q=SD\overline{C}+\overline{SC}q$ | I | $\overline{\text{Sample}}$ input & C | $\overline{\text{Sample}}$ input & B | Data input | Clear input | G | F | Q | A,$\overline{Q}$ |
| Complemented sample and hold flip-flop with a load input<br>$Q=SD+\overline{S}q+L$ | I | $\overline{\text{Sample}}$ input & C | $\overline{\text{Sample}}$ input & B | $\overline{\text{Data}}$ | Load input | G | F | $\overline{Q}$ | A,Q |
| One-bit delay (D flip-flop)<br>Q=Input delayed by 1 bit | | | | | | | (3) | $\overline{Q}$ | Q |
| AB comparator with and without delay (half adder)<br>$F=AB+\overline{AB}$<br>$Q=AB+\overline{AB}$ delayed by 1 bit<br>$Q=A\overline{B}+\overline{A}B$ delayed by 1 bit | A input and C | B input and D | A input and A | B input and B | Logic 0 | F output | F | $\overline{Q}$ | Q |
| Two-stream select gate<br>$F=CA+\overline{CB}$ | A input | C input and C | C input and B | B input | Logic 0 | F output | | | |
| Inverter<br>$F=\overline{A}$ | Logic 0 | Logic 0 | Logic 0 | A input | Logic 0 | F output | | | |
| Two-input nor-gate<br>$F=\overline{A+B}=\overline{AB}$ | Logic 0 | Logic 0 | A input | B input | Logic 0 | F output | | | |
| Two-input and-gate<br>$F=AB=\overline{A+B}$ | A input | B input | Logic 1 | Logic 1 | Logic 0 | F output | | | |
| Five-input complex gate<br>$F=AB+\overline{CD}+E$ | A input | B input | C input | D input | E input | F output | | | |

[1] C, B, Q output.
[2] $\overline{Q}$ output.
[3] Data input.

NOTE.—Q=True output and its state at bit-time $n+1$; $\overline{Q}$=Complemented output and its state at bit-time $n+1$; q=State of Q output at bit-time $n$; $\overline{q}$=State of $\overline{Q}$ output at bit-time $n$.

With the fifth input, which makes the clear or load function possible, the versatility of my circuit is greatly enhanced. For example, the JK flip-flop circuit with a clear input may be used as a shift register buffer in systems where data is fed in serially and where it is advantageous to clear the register periodically or at intervals between groups of data in order to assure that all flip-flops in a system commence to operate from a zero state.

In a binary or logic counter system, "T" or trigger flip-flop connections may be used to implement a closed-loop counter where, after a predetermined count is reached, the counter is automatically reset to the zero state.

Still another application for flip-flop circuits using the fifth input clear or load, is in feedback shift register counters. Here, the fifth input is used to automatically reset the counter into its correct counting sequence in case it should jump into the wrong counting loop.

Essentially, the clear or load input enables the flip-flop to be reset to a logic 0 or a logic 1 state, respectively, regardless of the normal logical inputs, an extremely important capability of which the aforesaid arrangements are merely examples.

Figure 4:
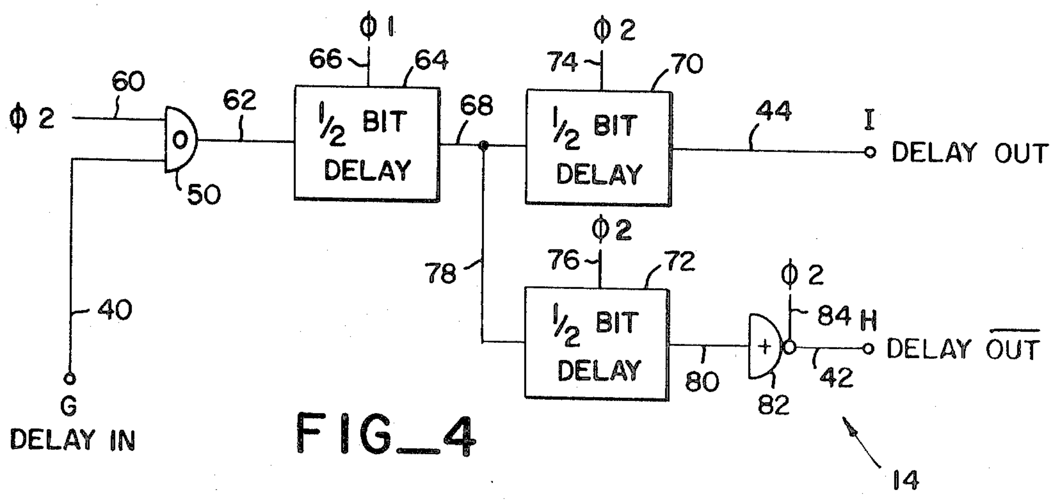
FIG. 4 is one embodiment of a schematic logic diagram for a one-bit of delay circuit for the logic circuit of FIG. 1.

The one-bit delay section 14 is an important feature of my logic circuit 10 in that it provides isolation between its two outputs H and I. A schematic logic diagram of one form of the delay section that makes this possible is shown in FIG. 4. Here, the conductor 40 from the delay section input G is connected to the data sampler 50 which acts as a switch and is shown merely as an AND-gate. A second input to this AND-gate 50 is a timing input 60 at a time phase of $0_2$ which may be connected, for example, from the conductor 46, shown in FIG. 1. The output signal from the AND-gate 50 is impressed through a conductor 62 on a first one-half bit-of-delay circuit 64 which also receives a timing input at a time phase of $0_1$ through a conductor 66. The output from the first one-half bit-of-delay circuit 64 through a conductor 68 is connected in parallel to second and third one-half bit-of-delay circuits 70 and 72, respectively. These latter delay circuits in parallel are each supplied with a timing signal at phase $0_2$ through conductors 74 and 76, respectively. The output from the second one-half bit-of-delay circuit 70 is thus delayed one full bit time from the data sampler 50 and is supplied to the terminal I over the conductor 44. The third one-half bit-of-delay circuit 72 is connected by a conductor 78 to the conductor 68, and its output over a conductor 80 is fed to an inverter 82 which also receives a timing input through a conductor 84 at the phase $0_2$. Thus, the output from the inverter 80 through the conductor 42 provides the complemented output of the delay section. It is seen that complete isolation of the true and complemented outputs of the delay section 14 are provided because the full one-bit of delay is accomplished in two discrete one-half bit-of-delay stages and neither output H nor I is derived from the other but rather from the first one-half bit-of-delay stage circuit 64. The second stage, one-half bit-of-delay circuits 70 and 72, provide separate signal delay paths for generation of the two outputs H and I.

Figure 5:
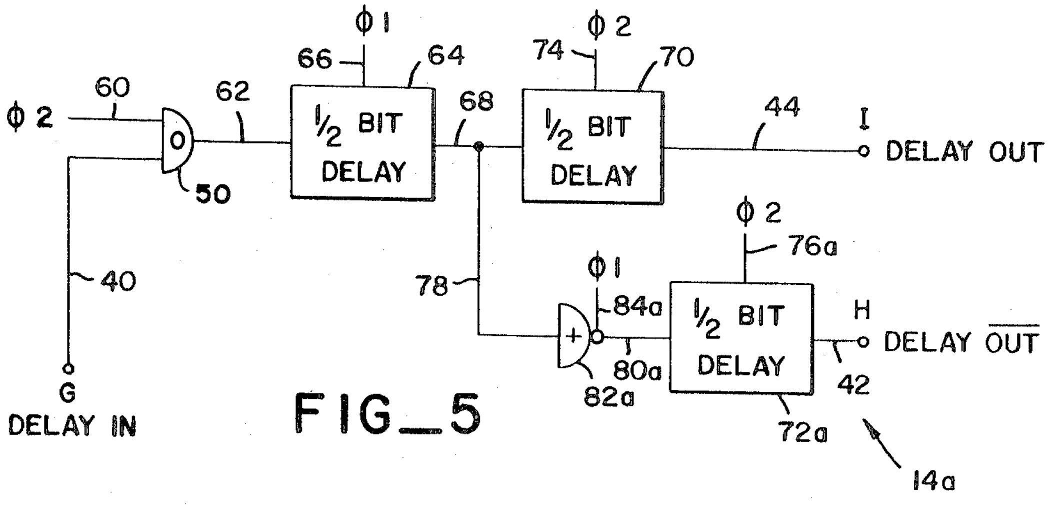
FIG. 5 shows a schematic logic diagram of a modified form of the one-bit of delay circuit of FIG. 4.

In a modified form of the delay section 14 shown in FIG. 5, the arrangement of elements is essentially the same as in the delay circuit of FIG. 4. However, here the conductor 78 connected to the conductor 68 between the first and second one-half bit-of-delay circuits is connected directly to an inverter 82*a* which also receives a timing input at the time phase $0_1$ over a conductor 84*a*. The output of the inverter 82*a* is now fed through a conductor 80*a* to a third one-half bit-of-delay circuit 72*a*, which receives a timing input at the time phase $0_2$ over a conductor 76*a*. The latter's output which is thus the complemented one-bit delay signal over a conductor 42 is thus supplied to the output terminal H. A distinct advantage of this latter arrangement over the embodiment of FIG. 4 is that output H no longer has the inverter which requires a finite time to function properly between the third one-half bit-of-delay circuit and its output terminal. This means that both outputs H and I bear the same timing relationship to time phase $0_2$ since both are connected directly to the outputs of the second stage one-half bit-of-delay circuits 70 and 72.

Figure 6:
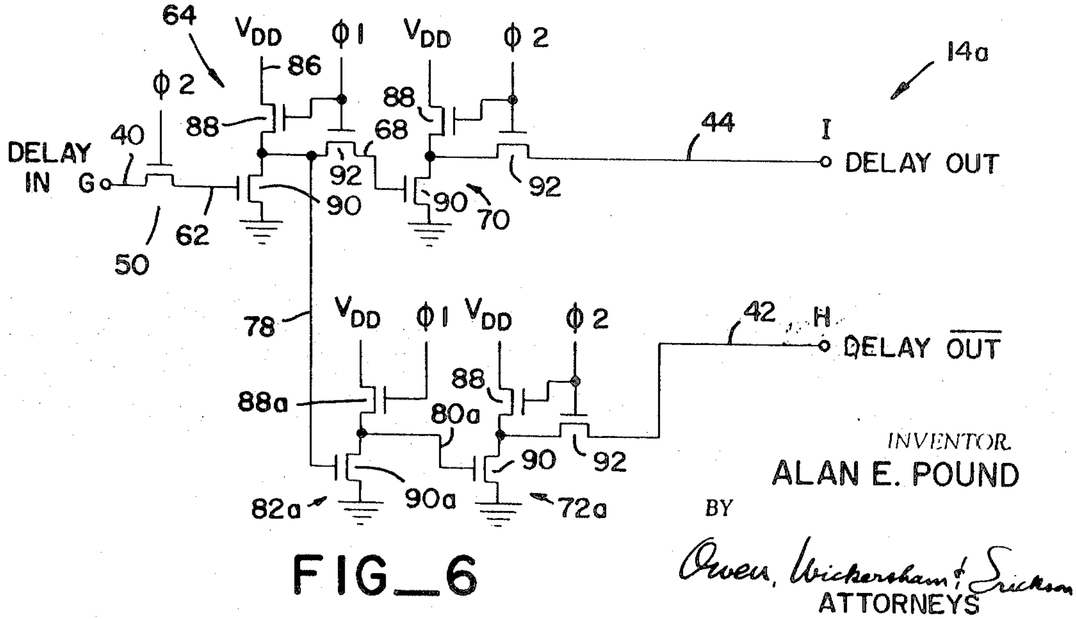
FIG. 6 is a schematic circuit diagram for the one-bit of delay circuit of FIG. 5.

A more detailed circuit diagram in FIG. 6 shows one arrangement of components for the one-bit-of-delay section of FIG. 5 using metal oxide semiconductors for implementation. As shown, the data sampler 50 which receives the timing input through a conductor 40 may be a single transistor. The one-half bit-of-delay units 64, 70 and 72 each have the same circuit configuration and include the same type of elements in combination. Thus, each has a conductor 86 from a source of power ($V_{DD}$) connected to the first of a pair of transistors 88 and 90 in series, the second one being connected to ground. A third transistor 92 is connected to the junction of the transistors 88 and 90. The base of the first transistor and the gate of the third transistor 92 are connected to a timing input which, for the circuit 64 is at the time phase $0_1$ and for both the circuits 70 and 72*a* is at the time phase $0_2$. For the circuit 64, the base of the second transistor 90 is connected to the input lead 62 which is the output from the data sampler transistor 50. Similarly, the base of the second transistor 90 in the circuit 70 is connected to the lead 68, which is the output of the first one-half bit-of-delay circuit 64. The base of the second transistor 90 in the circuit 72*a* is connected to the output of the inverter 82*a* over the conductor 80*a*. The inverter circuit 82*a* is similar to the one-half bit-of-delay circuits 64, 70 and 72*a* in that it comprises a conductor 86*a* from a power source ($V_{DD}$) connected to the first of a pair of transistors 88*a* and 90*a*. The base of the transistor 88*a* is connected to a timing input at the phase time $0_1$ and the base of the second transistor 90*a* is connected to the conductor 78. Conductor 78 is shown connected to the opposite side of transistor 92 from the conductor 68 in order to obtain more favorable operating characteristics. Essentially this results from a better charge transfer from the output of delay circuit 64 to the input of delay circuit 70 due to the increased capacitance at the junction of transistors 88 and 90 of delay circuit 64 and the decreased capacitance at the input of transistor 90 of delay circuit 70.

The lead 68 is connected between the transistors 88 and 90 and through a transistor 92 whose base is connected to the same timing input ($0_1$) as the transistor 88 of the first one-half bit-of-delay circuit 64. Also, the output 44 of the one-half bit-of-delay circuit 70 is connected between its transistors 88 and 90 and through a transistor 94 before reaching the true delay output terminal I, and its base is connected to the timing input at phase $0_2$. Similarly, a transistor 96 is in the output conductor 42 which, in the circuit 72*a* is connected to the lead between its transistors 88 and 90. The base of this transistor 96 is also connected to a timing input at the phase $0_2$.

The operation of my two-stage bit-of-delay section 14 may be described generally as follows: The signal received at the input G is transferred to the input of the transistor 90 of the delay circuit 64 at time phase $0_2$ by the data sampler 50. The transistors 88 and 88*a* in the delay section 14*a* have a much higher "on" resistance than the transistors 90 and 90*a* and act as load resistors for transistors 90 and 90*a*. These transistors 88 and 88*a* are switched on by the appropriate timing phase $0_1$ or $0_2$. At time phase $0_1$ the transistors 88 of delay circuit 64 and the transistor 88*a* of the inverter circuit 82*a* are switched on. The complement of the input signal is present on conductor 78, where it is again inverted by inverter 82*a* and transferred to delay circuit 72*a* by a conductor 80*a*. At the same time, the signal present on conductor 78 is transferred directly to the input of delay circuit 70 via transistor switch 92 of delay circuit 64 and conductor 68. Thus, one-half a bit time after the data input from terminal G was transferred by the data sampler 50, the true form of this data is present at the input of the delay circuit 72*a* and the complemented form of the input data is present at the input of the delay circuit 70. One-half bit time later, at time phase $0_2$, these data are inverted and presented to output terminals H and I through transistor switches 92 of delay circuits 72*a* and 70, respectively. Thus, the data input signal is inverted twice to generate the true form of the delay section output at terminal I and is inverted three times to generate the complemented form of the delay output at the terminal H.

Figure 7:
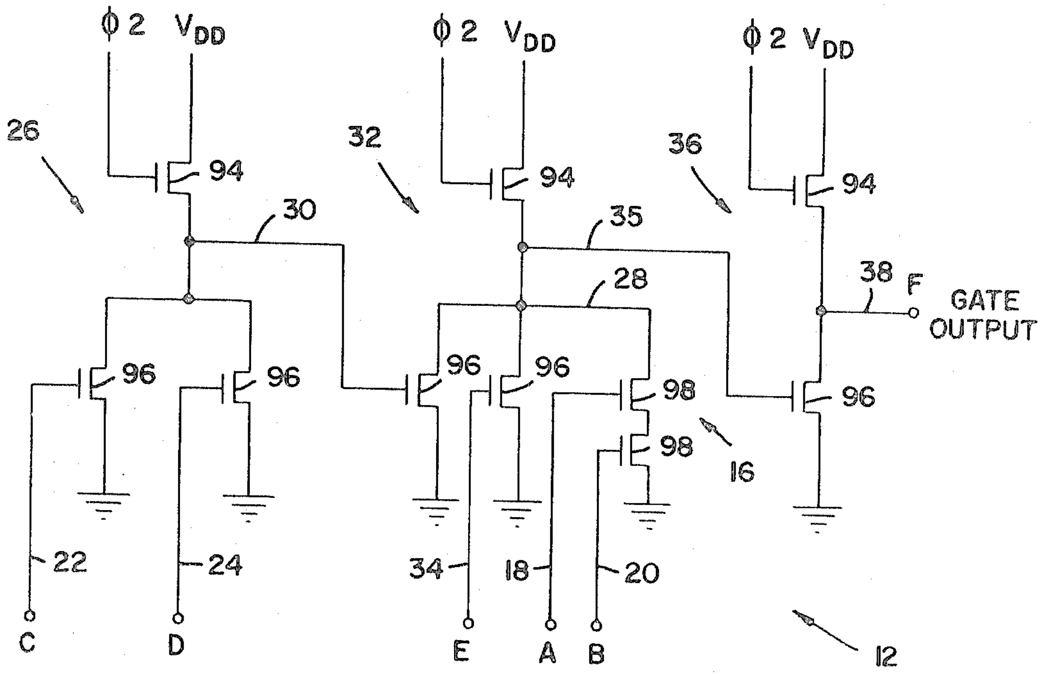
FIG. 7 is a schematic circuit diagram for the gate section of my logic circuit.

Like the delay section 14 shown in FIG. 6, the gate section 12 of my logic circuit is also particularly adaptable for manufacture as a metal oxide semiconductor device. Thus, these two sections in combination can be constructed as a single monolithic unit or integrated circuit chip having all of the aforesaid functional features and advantages. A circuit diagram of an exemplary embodiment for the gate section using field effect transistor elements in a metal oxide semiconductor device is shown in FIG. 7. The NOR-gate circuit 26 which receives its inputs from C and D through conductors 22 and 24, is comprised of a switched load transistor 94 and two inverting transistors 96. Its output is connected to the NOR-gate circuit 32 by the conductor 30. This NOR-gate circuit 32 comprises a switched load transistor 94, two inverting transistors 96 and an input conductor 28 from the AND-gate circuit 16 comprised of two series connected, pulldown transistors 98. The NOR-gate circuit 32 also receives an input from terminal E via conductor 34. The AND-gate circuit 16 receives its two inputs from terminals A and B. The inverter circuit 36, which receives its input from the NOR-gate circuit 32, comprises a switched load transistor 94 and a single inverting transistor 96. Its output is connected to terminal F by conductor 38. These aforesaid elements in the complex gate section 12 execute their logical functions in accordance with well-known principles to accomplish the circuit requirements described earlier and shown on the included chart.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a logic circuit, a one-bit-delay section for providing electrically isolated true and complemented outputs at one-bit time after an input signal comprising:

a first stage for delaying the input by one-half a bit time;

a second stage including two branch sections both connected to said first stage for delaying its output by another one-half a bit time and providing outputs that are delayed one full bit time;

and inverter means in one of said two branch sections for providing an inverted output signal.

2. The one-bit delay section as claimed in claim 1 wherein said first stage comprises a first one-half bit-of-delay circuit and a data sample means receiving a data input signal and connected to said first one-half bit-of-delay circuit.

3. The one-bit delay section as claimed in claim 2 wherein a first branch of said second stage comprises a second one-half bit-of-delay circuit providing a true output one-bit delay signal and the second branch of said second stage comprises a third one-half bit-of-delay circuit connected in series with said inverter means.

4. The one-bit delay section as claimed in claim 3 wherein each of said one-half bit-of-delay circuits comprises first and second transistors connected in series with input of said first transistor being connected to a source of power and the output of said second transistor being connected to ground, and a third transistor connected to a junction between said first and second transistors; means providing a timing pulse at a phase $0_1$ simultaneously to the gates of said first and third transistors of the first one-half bit-of-delay, and means providing another timing pulse at a phase $0_2$ simultaneously to the gates of the first and third transistors of said second and third one-half bit-of-delay circuits.

5. The one-bit delay section as claimed in claim 1 wherein said inverter means in said second stage is connected directly to said first one-half bit-of-delay circuit and thereby providing an inverted signal to said third one-half bit-of-delay circuit.

6. The one-bit delay section as claimed in claim 5 wherein said inverter means is connected to said first one-half bit-of-delay circuit at a conductor extending between a junction of said first and second transistors and said third transistor.

* * * * *

UNITED STATES PATENT OFFICE
CERTIFICATE OF CORRECTION

Patent No. 3,626,202 Dated December 7, 1971

Inventor(s) Alan E. Pound

It is certified that error appears in the above-identified patent and that said Letters Patent are hereby corrected as shown below:

Column 2, line 63, "of" should read -- or -- . Column 5, between lines 35 and 40, the column headed with a capital "Q" should read -- q -- . Column 7, line 67, "sued" should read -- used -- . Column 8, in the third section under the heading "ALTERNATE LOGIC CIRCUIT EMBODIMENTS" and below the subheading "F", the letter "C" should read -- G -- . Column 10, where the section begines "AB comparator with and without delay (half adder)", there should be a line above the last letter "Q". Throughout the patent starting from Column 11, there has been the omission of the syllable Phi, i.e. where "Phase $\emptyset_1$ or $\emptyset_2$" is mentioned, the diagonal line has been omitted to showing only Phase $O_1$ or Phase $O_2$ . This is also typical in claim 4.

Signed and sealed this 14th day of November 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O - 366-334.